US008096649B2

(12) United States Patent
Sambhy et al.

(10) Patent No.: US 8,096,649 B2
(45) Date of Patent: Jan. 17, 2012

(54) IMAGE CONDITIONING COATING

(75) Inventors: Varun Sambhy, Webster, NY (US);
Bryan J. Roof, Newark, NY (US);
Kock-Yee Law, Penfield, NY (US);
Hong Zhao, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 256 days.

(21) Appl. No.: 12/625,472

(22) Filed: Nov. 24, 2009

(65) Prior Publication Data

US 2011/0122210 A1 May 26, 2011

(51) Int. Cl.
*B41J 2/01* (2006.01)
(52) U.S. Cl. .................................. 347/101; 525/500
(58) Field of Classification Search .................. None
See application file for complete search history.

(56) References Cited

U.S. PATENT DOCUMENTS

| | | |
|---|---|---|
| 4,889,560 A | 12/1989 | Jaeger et al. |
| 4,889,761 A | 12/1989 | Titterington et al. |
| 5,221,335 A | 6/1993 | Williams et al. |
| 5,230,926 A | 7/1993 | Narang et al. |
| 5,372,852 A | 12/1994 | Titterington et al. |
| 5,432,539 A | 7/1995 | Anderson |
| 5,621,022 A | 4/1997 | Jaeger et al. |
| 5,867,189 A | 2/1999 | Whitlow et al. |
| 6,284,377 B1 | 9/2001 | Veerasamy |
| 6,737,109 B2 | 5/2004 | Stanton et al. |
| 6,775,502 B1 | 8/2004 | Domoto et al. |
| 7,259,275 B2 | 8/2007 | Belelie et al. |
| 7,271,284 B2 | 9/2007 | Toma et al. |
| 7,276,614 B2 | 10/2007 | Toma et al. |
| 7,279,587 B2 | 10/2007 | Odell et al. |
| 2005/0206705 A1 | 9/2005 | Ma et al. |
| 2006/0078724 A1 | 4/2006 | Bhushan et al. |
| 2007/0120910 A1 | 5/2007 | Odell et al. |
| 2007/0123606 A1 | 5/2007 | Toma et al. |
| 2008/0225082 A1 | 9/2008 | Mcavoy et al. |
| 2008/0316247 A1 | 12/2008 | Cellura et al. |
| 2009/0046125 A1 | 2/2009 | Nystrom et al. |
| 2009/0141110 A1 | 6/2009 | Gervasi et al. |
| 2009/0142112 A1 | 6/2009 | Gervasi et al. |

OTHER PUBLICATIONS

U.S. Patent Application filed of even date herewith, Nov. 24, 2009, of Gregory J. Kovacs et al., entitled "Coating For An Ink Jet Printhead Front Face" 26 pages, 6 drawing sheets.
U.S. Patent Application filed Aug. 19, 2009, of David J. Gervasi et al., entitled "Polyhedral Oligomeric Silsesquioxane Image Conditioning Coating" 39 pages, 4 drawing sheets.
U.S. Patent Application filed Dec. 9, 2008, of Steven E. Ready et al., entitled "Spreading and Leveling of Curable Gel Ink" 13 pages, 4 drawing sheets.
Rios et al., "The Effect of Polymer Surface On The Wetting and Adhesion of Liquid Systems," J. Adhesion Sci. Technol., vol. 21, No. 3-4, pp. 227-241 (2007).
Zisman, "Relation of the Equilibrium Contact Angle to Liquid and Solid Constitution," Advances in Chemistry Series, (1964), 43, 1-51.
Fluorolink Polymer Modifiers Product Data Sheet, www.solvaysolexis.com, pp. 1-5, 2004.

(Continued)

*Primary Examiner* — Stephen Meier
*Assistant Examiner* — Alexander C Witkowski
(74) *Attorney, Agent, or Firm* — Marylou J. Lavoie, Esq. LLC

(57) ABSTRACT

A contact leveling surface for an ink jet imaging member comprising a low adhesion coating, wherein when the low adhesion coating is disposed on a contact leveling surface, jetted drops of ultra-violet gel ink exhibit a low sliding angle with the contact leveling surface, wherein the low sliding angle is less than about 1° to less than about 30°.

20 Claims, 4 Drawing Sheets

OTHER PUBLICATIONS

Ahuja et al., "Nanonails: A Simple Geometrical Approach to Electrically Tunable Superlyophobic Surfaces," Langmuir, vol. 24, No. 1, 2008, Published on Web Oct. 12, 2007, pp. 9-14.

BYK Additive Data Sheet PS1, www.byk.com/additives, 2 pages, Issue Feb. 2008.

BYK Additive Data Sheet S211, www.byk.com/additives, 4 pages, Issue May 2008.

BYK Additive Data Sheet S209, www.byk.com/additives, 4 pages, Issue Aug. 2008.

DesdomurN3300A Product Information, www.bayermaterialscienceNAFTA.com, 2 pages, Feb. 2008.

Desmophen A 870 BA Product Information, www.bayermaterialscienceNAFTA.com, 2 pages, Nov. 2002.

Koene et al., "Ultrahydrophobic Coatings," Smart Coatings Proceeding, Feb. 27-29, 2008, 40 pages.

U.S. Patent Application filed of even date herewith, Nov. 24, 2009, of Gregory J. Kovacs et al., entitled "Coating For An Ink Jet Print Head Front Face" 26 pages, 6 drawing sheets, U.S. Appl. No. 12/625,442.

U.S. Patent Application filed Aug. 19, 2009, of David J. Gervasi et al., entitled "Polyhedral Oligomeric Silsesquioxane Image Conditioning Coating" 39 pages, 4 drawing sheets, U.S. Appl. No. 12/544,031.

U.S. Patent Application filed Dec. 9, 2008, of Steven E. Ready et al., entitled "Spreading and Leveling of Curable Gel Ink" 13 pages, 4 drawing sheets, U.S. Appl. No. 12/331,076.

U.S. Patent Application filed Dec. 15, 2008, of Liang-Bih Lin et al., entitled "Protective Coatings For Solid Ink Jet Applications" 16 pages, U.S. Appl. No. 12/334,848.

IMAGE CONDITIONING COATING

CROSS-REFERENCE TO RELATED APPLICATIONS

Copending application U.S. Ser. No. 12/625/442, filed concurrently herewith, entitled "Coating for an Ink Jet Printhead Front Face," with the named inventors Gregory Joseph Kovacs, Kock-Yee Law, Hong Zhao, and Varun Sambhy, the disclosure of which is totally incorporated herein by reference, discloses a coating for an ink jet printhead front face.

BACKGROUND

Disclosed herein is an image conditioning coating, and more particularly disclosed is a contact leveling coating for a contact leveling member in a printing device. The contact leveling coating can be used with imaging materials including ultraviolet (UV) curable gel inks to provide offset-free, robust, and reliable image conditioning and to provide improved reliability of print engine components. In a specific embodiment, a contact leveling coating for a direct to paper ink jet imaging member is disclosed. In another specific embodiment, a contact leveling coating for use with UV curable gel inks is disclosed.

Ink jet printing systems commonly use either a direct printing architecture or an offset printing architecture. In a typical direct printing system, ink is ejected from jets in the printhead directly onto the final receiving web or substrate such as paper. In an offset printing system, the image is formed on an intermediate transfer surface and subsequently transferred to the final receiving substrate such as a web or individual substrate such as paper.

UV curable gel inks are in the gel phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of ink drops. UV curable gel ink is typically jetted at a temperature of about 75° C. and has a melt viscosity at jetting temperature of about 10 centipoise.

Phase change inks such as UV curable gel inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

However, gel inks require some type of transformation such as curing to prevent them from running or smearing when printed onto a substrate and subjected to general handling. In addition, uncured gel inks stick to roller surfaces in print paths, making them unsuitable for many printing applications without some sort of transformation or curing. There is a desire to have the ink leveled prior to having it UV cured. The reason for this is so that gloss is more uniform, missing jets can be masked, and certain applications such as packaging require thin layers of relatively constant thickness. Since these inks have a mayonnaise consistency, they have very little cohesive strength prior to curing. In addition, gel inks are typically designed to have good affinity to many materials. This means that conventional methods for flattening a layer of ink tend to fail, because the ink splits and leaves much of the image behind on the device trying to flatten it, such as a traditional fuser roll typically used in xerography. The present description proposes a way to resolve this issue.

Direct to paper as-is printed images can require image conditioning (leveling) to improve image quality and gloss. FIG. 1 illustrates a simplified ink jet printing system 100 wherein a printhead nozzle 102 jets ink droplet 104 directly to a final receiving substrate such as paper 108 to form printed image droplet 106 on the paper 108. Due to surface energy profiles, the jetted ink drops bead up on the surface of paper, resulting in a contact angle between the printed droplet 106 and the paper 108 as indicated by arrows 110, 111, 112, wherein $\gamma_1(T)$ is the surface tension of the ink, $\gamma_2(T)$ is the surface tension of the paper, $\gamma_{12}(T)$ is the interfacial tension between the paper 108 and the ink 106, wherein the force balance in the plane of paper is $$\rightarrow \gamma_1 \cos\theta + \gamma_{12} = \gamma_2; \text{ and}$$

$$\rightarrow \cos\theta = (\gamma_2 - \gamma_{12})/\gamma_1(T).$$

Contact angle pinning, along with the presence of intermittent missing and weak jets, can lead to non-uniform streaky ink profiles resulting in low image quality and low image gloss. Several approaches have been proposed to condition a printed image, such as non contact techniques including thermal reflow, air knife shearing, modifying the ink formulation to achieve a 120 micrometer line width, and contact leveling techniques.

U.S. Patent Publication 20090141110, published Jun. 4, 2009, which is hereby incorporated by reference herein in its entirety, discloses a printing apparatus, including a) a printing station with at least one printhead for applying phase change ink to a substrate in a phase-change ink image, and b) an ink spreading station including a heated or unheated ink spreading member and a back-up pressure member in pressure contact with the ink spreading member, and wherein a nip is formed between the ink spreading member and the back-up pressure member for spreading the phase change ink image on the substrate, wherein said substrate is passed through the nip, and wherein the pressure member includes i) a substrate, and ii) an outer coating having a polymer matrix with an oleophobic resin, a fluoropolymer lubricant, and a first additive.

U.S. Patent Publication 20090142112, published Jun. 4, 2009, which is hereby incorporated by reference herein in its entirety, discloses an offset printing apparatus for transferring and optionally fixing a phase change ink onto a print medium including a) a phase change ink application component for applying a phase change ink in a phase change ink image to an imaging member; b) an imaging member for accepting, transferring and optionally fixing the phase change ink image to the print medium, the imaging member having: i) an imaging substrate, and thereover ii) an outer coating comprising a polymer matrix with an oleophobic resin, a fluoropolymer lubricant, and a first additive, and c) a release agent management system for supplying a release agent to the imaging member wherein an amount of release agent needed for transfer and optionally fixing the phase change ink image is reduced.

While currently available image conditioning methods and devices are suitable for their intended purposes, a need remains for an improved image conditioning surface that can contact an image and level the image while remaining inkphobic enough to prevent offset to the contact leveling surface. There further remains a need for improved image conditioning that provides improved image quality, image gloss, and that compensates for missing or weak jets. There further remains a need for a contact leveling coating that provides green, robust, and reliable image conditioning for ultra-violet curable gel ink print engines. There further remains a need for a contact leveling coating that is wear resistant, thermally stable when heated to operating temperature, has consistent mechanical properties under high load, resists adhesion of ink, and is oleophobic.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described herein is a contact leveling surface coating that can be disposed on a contact leveling substrate for an ink jet imaging member, wherein the coating provides that jetted drops of ultra-violet gel ink exhibit very little adhesion towards the contact leveling surface. The adhesion is measured by the sliding angle of the gel ink drop, wherein the lower the sliding angle, the lower the adhesion between the ink drop and the surface. In embodiments, a contact leveling surface for an ink jet imaging member comprises a low adhesion coating, wherein when the low adhesion coating is disposed on a contact leveling surface, jetted drops of ultra-violet gel ink exhibit a low sliding angle with the contact leveling surface, wherein the low sliding angle is less than about 1° to less than about 30°. In embodiments, low adhesion herein means a low sliding angle, wherein the low sliding angle is less than about 30°, less than about 25°, less than about 20°, or less than about 15°, when measured with UV gel ink with the contact leveling surface. In other embodiments, the low sliding angle is from less than about 1° to less than about 30°, less than about 1° to less than about 25°, less than about 1° to less than about 20°, or less than about 1° to less than about 15°, with the contact leveling surface. In embodiments, the coating provides this low adhesion property even after many wiping cycles thereby enabling long lasting low adhesion leveling surfaces. In embodiments, the contact leveling coating comprises an oleophobic coating. The term "oleophobic" is defined herein as a material or surface that lacks affinity for oil.

Further described is a printing apparatus comprising a printing station including at least one printhead for applying ink to an image receiving substrate to create an ink image, wherein the ink comprises an ultra-violet curable gel ink; a contact leveling member for conditioning the ink image by disposing the contact leveling member in pressure contact with the ink image; wherein the contact leveling member comprises a substrate and a contact leveling coating disposed over the substrate; and wherein the contact leveling coating comprises an oleophobic coating which provides that the leveling surface exhibits very little adhesion towards jetted drops of ultra-violet curable gel ink print media such as paper.

Also described is an image conditioning method comprising forming an image on an image receiving substrate with an ultra-violet curable gel ink; conditioning the image by disposing a contact leveling member in pressure contact with the ink image; wherein the contact leveling member comprises a substrate and a contact leveling coating disposed over the substrate; and wherein the contact leveling coating comprises an oleophobic coating which provides that jetted drops of ultra-violet gel ink exhibit very little adhesion towards the surface. In embodiments, the contact leveling coating comprises a low adhesion coating on which jetted drops of ultra-violet gel ink exhibit a low sliding angle on the leveling surface having the coating, wherein the low sliding angle is less than from about 1° to less than about 30°.

DETAILED DESCRIPTION

Contact leveling coatings are provided for an ink jet contact leveling surface which resist or prevent altogether offset of ultra-violet (UV) curable gel inks. In specific embodiments, the contact leveling coatings herein provide the leveling surface with sliding angle characteristics such that jetted drops of UV gel ink exhibit a low sliding angle, wherein the low sliding angle is less than about 30°, less than about 25°, less than about 20°, or less than about 15°, when measured with UV gel ink with the contact leveling surface. In other embodiments, the low sliding angle is from less than about 1° to less than about 30°, less than about 1° to less than about 25°, less than about 1° to less than about 20°, or less than about 1° to less than about 15°, with the contact leveling surface so that jetted ink drops which form the ink image do not adhere to the contact leveling surface (low adhesion surface).

In further embodiments, the coating properties herein are achieved with a suitable coating that can be made by cross-linking a diisocyanate with a hydroxyl-functionalized polyester in a solvent in the presence of a hydroxyl-functionalized polysiloxane crosslinking material and optionally, in specific embodiments, a second crosslinking fluorolink material. The low adhesion coatings can be disposed on a contact leveling drum, roll or belt surface. Any suitable method can be used for applying the low adhesion coating to the contact leveling surface. Suitable techniques for applying the coating include spray, flow and dip coating techniques. In one embodiment, these ingredients can be formulated into a polyurethane coating solution and applied onto the contact leveling surface. Certain known leveling techniques involve heating of jetted ink droplets to allow them to melt and reflow ("thermal reflow") and coalesce to level. This thermal reflow is achieved by energy intensive heating, for example, infrared lamp flash heating, convective heating, etc. The present system does not require heating to level the ink image.

In further embodiments, the contact leveling coatings provide the contact leveling surface sliding angle characteristics such that jetted drops of UV gel ink exhibit a low sliding angle on the leveling surface of from about 1° to less than about 30°, from about 1° to less than about 25°, or from about 1° to less than about 20°, or from about 1° to less than about 15°.

Figure 1:
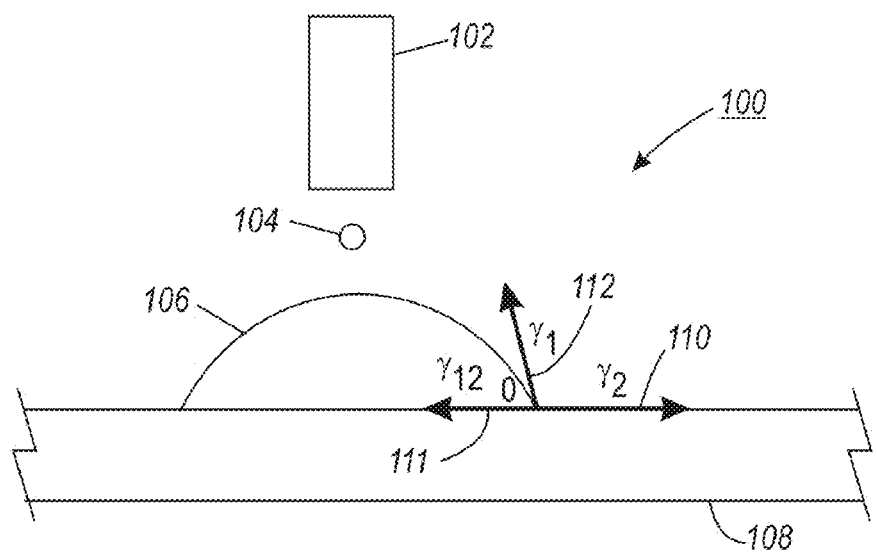
FIG. 1 is an illustration of a simplified ink jet printing system and a jetted ink droplet on a substrate.
Figure 2:
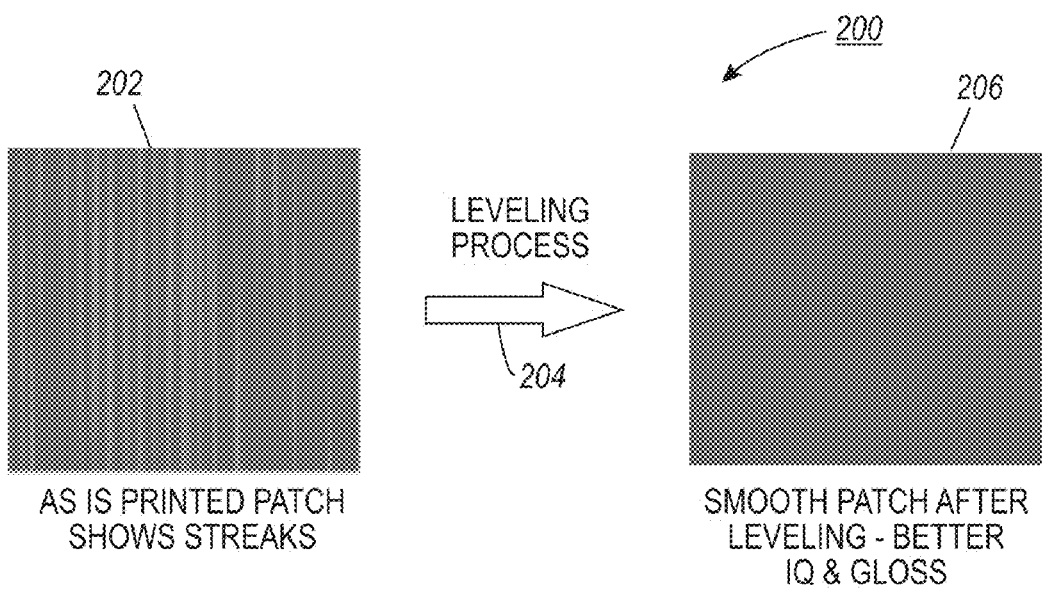
FIG. 2 is an illustration of a printed ink image before and after image conditioning in accordance with the present disclosure.

In embodiments, an image conditioning method is disclosed comprising forming an image on an image receiving substrate with an ultra-violet curable gel ink; conditioning the image by disposing a contact leveling member in pressure contact with the jetted ink image; wherein the contact leveling member comprises a substrate and a contact leveling coating disposed over the substrate; and wherein the contact leveling coating comprises an oleophobic coating which provides a low sliding angle indicating low adhesion, wherein the low sliding angle is from about 1° to less than about 30°, from about 1° to less than about 25°, or from about 1° to less than about 20°, or from about 1° to less than about 15°. FIG. 2 illustrates generally the present process 200 wherein an as-is printed image 202 having an undesirable streaky ink profile is treated by the present leveling process 204 to provide conditioned image 206 which exhibits a smooth image having improved overall image quality and improved image gloss.

Figure 3:
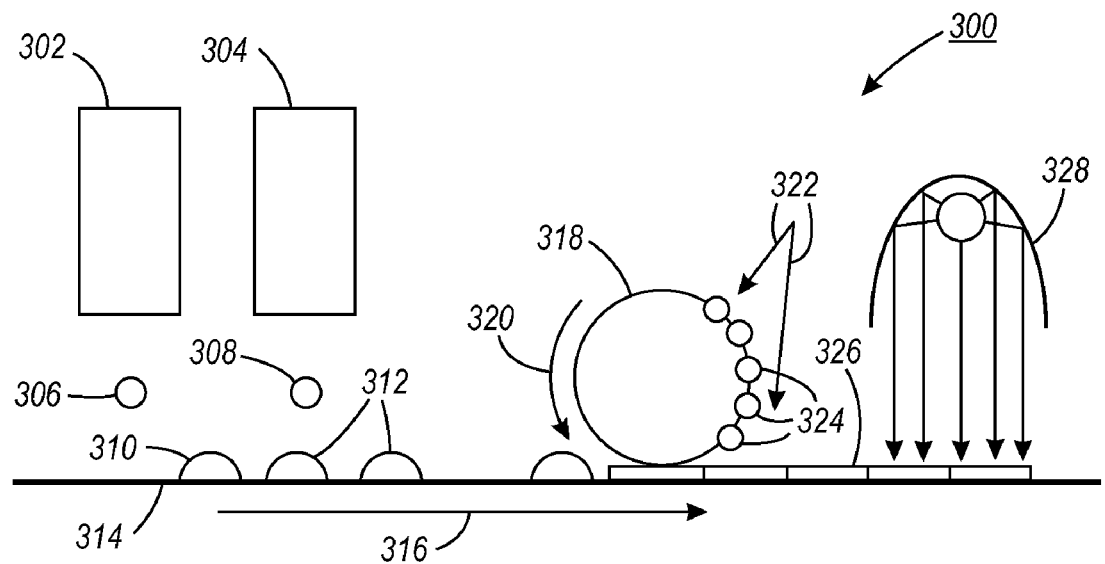
FIG. 3 is an illustration of ink offset on a previously available contact leveling surface.

In further embodiments, an ink jet printing apparatus is disclosed comprising a printing station including at least one printhead for applying ink to an image receiving substrate to create an ink image, wherein the ink comprises an UV curable gel ink; a contact leveling member for conditioning the ink image by disposing the contact leveling member in pressure contact with the ink image; wherein the contact leveling member comprises a substrate and a contact leveling coating disposed over the substrate; and wherein the contact leveling coating comprises an oleophobic coating which provides a low sliding angle indicating low adhesion, wherein the low sliding angle is from about 1° to less than about 30°, from about 1° to less than about 25°, or from about 1° to less than about 20°, or from about 1° to less than about 15°, with jetted drops of the ultra-violet curable gel ink. Turning to FIG. 3, an ink jet device and contact leveling process 300 includes ink jet printheads 302 and 304 for jetting ink droplets 306, 308 which form jetted ink image droplets 310, 312 on substrate 314, such as paper. Substrate 314 moves in direction of arrow 316 towards a conditioning station including contact leveling roller 318 which moves in the direction of arrow 320. Problematically, offset occurs wherein droplets 324, 326 adhere to the contact leveling roller. The printed image 326 advances in the direction of arrow 316 to UV curing station 328 wherein the ink image is cured. Curing of the ink can be effected by exposure of the ink image to actinic radiation at any desired or effective wavelength, such as from about 250 to about 350 nanometers, or from about 350 to about 450 nanometers, although the wavelength can be outside of these ranges. Exposure to actinic radiation can be for any desired or effective period of time, such as from about 0.001 to about 0.01 seconds, or from about 0.01 to about 1 seconds, or from about 1 to about 5 seconds, although the exposure period can be outside of these ranges. By curing is meant that the curable compounds in the ink undergo an increase in molecular weight upon exposure to actinic radiation, such as (but not limited to) crosslinking, chain lengthening, or the like. In a non-UV curable system, curing station 328 would be omitted, or an alternate curing device provided, depending on the nature of the ink selected.

Figure 4:
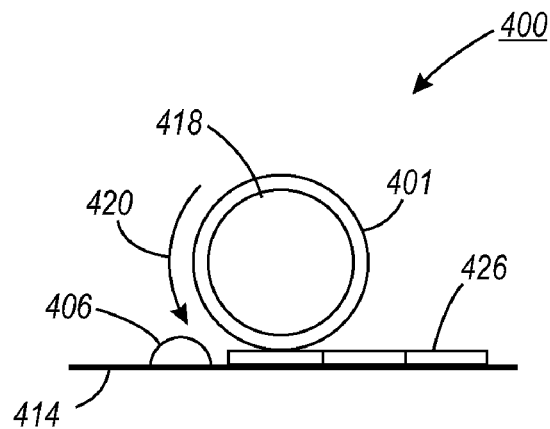
FIG. 4 is an illustration of a contact leveling surface in accordance with the present disclosure wherein there is no ink offset.

Turning to FIG. 4, a system 400 is illustrated, wherein a contact leveling coating 401 in accordance with the present disclosure is disposed on contact leveling roller substrate 418. Ink jet printheads, UV curing station, etc., are not shown in FIG. 4 for purposes of simplification but would be generally depicted as in FIG. 3. It is understood that the present contact leveling roller 418 having the present contact leveling surface 401 can be disposed in ink jet printing devices currently known or to be developed and is not limited to the devices described herein. It is further understood that while described as a drum or roller, any desired configuration can be selected for the contact leveling device herein, such as a sheet, a film, a web, a foil, a strip, a coil, a cylinder, a drum, an endless strip, a circular disc, a belt including an endless belt, an endless seamed flexible belt, and endless seamless flexible belt, and endless belt having a puzzle cut seam, a weldable seam, and the like, without limitation. The contact leveling roller 418 will typically form a nip with an opposing roller or other device (not shown) situated such that the contact leveling roller is in contact with the image side of the substrate and the opposing roller contacts the non-image side of the substrate.

In embodiments, the process includes increasing the transit speed of the image receiving substrate through the contact leveling nip. In embodiments, transit speeds of from about 1 inch per second to about 100 inches per second, can be selected.

The substrate 418 on which the present contact leveling coating 401 is disposed can be any suitable substrate such as any material having suitable strength and other desirable characteristics. Examples of suitable contact leveling substrate materials include metals, rubbers, fiberglass composites, and fabrics. Examples of metals include steel, aluminum, nickel, and the like, along with alloys thereof. The thickness of the substrate can be selected according to the type of imaging member employed. In embodiments where the substrate is a belt, film, sheet, or the like, the substrate thickness is typically from about 1 to about 100 microns or from about 100 to about 1000 microns, although not limited. In embodiments where the substrate is in the form of a drum, the substrate thickness is typically from about 1/100 of an inch to about 1 inch, or from about 1/16 to about 5/8 inch, although not limited.

Optionally, an intermediate conformable layer positioned between the contact leveling substrate 418 and the contact leveling surface coating 401. Materials suitable for use as the intermediate conformable layer can include silicones, fluoroelastomers, fluorosilicones, ethylene propylene diene rubbers, and the like, and mixtures thereof. Having a conformable intermediate layer will improve the uniformity of the contact during leveling. In embodiments, the intermediate layer is conformable and has a thickness of from about 5 to about 25 microns or from about 26 to about 100 microns, although not limited. Optionally adhesion layers between the substrate 418 and the intermediate conformable layer; and between the intermediate conformable layer and the contact leveling layer can be used to improve the bonding and the mechanical integrity of the multi-layer structure.

The contact leveling coatings herein can comprise any suitable coating that provides the desired properties of a low sliding angle so that jetted ink drops which form the ink image do not adhere to the contact leveling surface, as described herein. In embodiments, the low adhesion coating comprises a suitable polymer or oligomer containing an isocyanate functional group; a suitable polymer or oligomer containing a hydroxyl functional group; a suitable hydroxyl functionalized polymer or oligomer containing at least one polysiloxane unit; and optionally, a hydroxyl functionalized fluoro-crosslinking material.

In embodiments, the contact leveling coating herein can comprise an isocyanate, a polylol; and a hydroxyl functionalized fluoro-crosslinking material, in embodiments, a polysiloxane. In one embodiment, the low adhesion coating herein can comprise Components A, B, and C, wherein Component A can be a hydroxyl functionalized polyester, such as Desmophen® (available from Bayer Materials Science); Component B can be an isocyanate, such as Desmodur® or Bayhydur® (available from Bayer Materials Science); and Component C can be a hydroxyl functionalized polysiloxane crosslinking material, such as BYK-Silclean® (available from BYK Additives and Instruments).

Component A of the low adhesion coating can be any suitable polymer or oligomer containing hydroxyl (—OH) functional groups. For example, Component A can be selected from the group consisting of hydroxyl functional polymers or oligomers such as polyvinyls, polystyrenes, polyacrylates, polyester, polyethers, and mixtures thereof. In a specific embodiment, Component A is a hydroxyl functional polyacrylate resin sold under the name Desmophen® A 870 BA available from Bayer Materials Science.

Component B of the low adhesion coating can be any suitable polymer or oligomer containing isocyanate (—NCO) functional groups. For example, Component B can be selected from the group consisting of isocyanate functional polymers or oligomers such as polyvinyls, polystyrenes, polyester, polyacrylates, and mixtures thereof. In embodiments, the isocyanate can be selected from the group consisting of diphenylmethane diisocyanate, toluene diisocyanate, hexamethylene diisocyanate, isophorone diisocyanate, or suitable polymer or oligomer containing isocyanate (—NCO) functional groups, and mixtures thereof. In a specific embodiment, Component B is a solvent free aliphatic isocyanate resin based on hexamethylene diisocyanate sold under the name Desmodur® N 3300 A available from Bayer Materials Science.

Component C of the low adhesion coating can be any suitable hydroxyl-functionalized polymer or oligomer containing polysiloxane unit/s. For example, Component C can be selected from the group consisting of hydroxyl-functionalized polymers or oligomers containing polysiloxane unit/s such as polyvinyls, polystyrenes, polyacrylates, polyethers, and mixtures thereof. In a specific embodiment, Component C is a hydroxyl-functionalized polymer consisting of polysiloxane side-chains on hydroxyl-functional polyacrylate backbone sold under the name BYK-Silclean® 3700 available from BYK Additives and Instruments.

Optionally, the low adhesion coatings herein can include a Component D comprising a fluoro-crosslinking material. Any suitable fluoro-crosslinking material can be selected. In embodiments, the hydroxyl-functionalized fluoro-crosslinking material is a polymer modifier sold under the name Fluorolink®, for example, Fluorolink-D®, Fluorolink-D10H®, Fluorolink-E10H® available from Solvay Solexis.

The components of the low adhesion coating can be present in any suitable amount. For example, Component A can be present in an amount of from about 40 to about 80, or more specifically from about 55 to 70 weight percent based upon the total weight of the low adhesion coating, although not limited. Component B can be present in an amount of from about 15 to about 50, or more specifically from about 20 to about 45 weight percent based upon the total weight of the low adhesion coating, although not limited. Component C can be present in an amount of from about 0.1 to about 15, or more specifically from about 1 to about 10 weight percent based upon the total weight of the low adhesion coating, although not limited. Optional Component D, if present, can be present in an amount of from about 0.01 to about 5, or more specifically from 0.1 to 3 weight percent based upon the total weight of the low adhesion coating, although not limited.

The contact leveling coatings herein can be prepared by any suitable method. For example, the components can be combined with mixing at ambient temperature (about 25° C.) to provide a contact leveling coating. The components can be mixed with a suitable solvent or provided neat. In embodiments, the solvent can be any suitable organic solvent, including, but not limited to, methyl isobutyl ketone, butyl acetate, methyl n-amyl ketone, methylene chloride, chloroform, methyl ethyl ketone, and mixtures and combinations thereof. The solvent can be provided in any suitable amount, such as from about 25 to about 65 weight percent based on the total weight of the coating, although not limited.

In another embodiment, a contact leveling coating can be prepared by combining an isocyanate, a polyol, and a polysiloxane with mixing at ambient temperature (about 25° C.) to provide a contact leveling coating. In embodiments, after coating, the coating is heat-cured to provide a thin polyurethane film with incorporated silicone segments throughout the thin film.

The contact leveling coatings herein can be disposed on the contact leveling substrate using any suitable method such as dip coating, spray coating, spin coating, flow coating, stamp printing, ink jet print coating, and blade techniques. An air atomization device such as an air brush or an automated air/liquid spray can be used for spray coating. The air atomization device can be mounted on an automated reciprocator that moves in a uniform pattern to cover the surface of the substrate with a uniform coating. The use of a doctor blade is another technique that can be employed to apply the coating material. In flow coating, a programmable dispenser is used to apply the coating material. In ink jet print coating, a coating device with an ink jet print head is used to apply the coating to the substrate using ink jet processes.

After application of the coating, a vacuum can optionally be applied to remove excess coating solvent.

The wet coating can be any suitable thickness. In embodiments, the wet coating is disposed on the substrate at from about 1 micrometer to about 100 micrometers or from about 20 micrometers to about 65 micrometers thick.

The coating can be heat cured to an appropriate temperature for drying and curing. In embodiments, the coating is disposed on the substrate surface and then heated. In embodiments, the coating is heated to a temperature of about 100° C. to about 180° C. for about 5 to about 60 minutes. After drying and curing, the coating has a thickness of from about 1 micrometer to about 100 micrometers or from about 20 micrometers to about 65 micrometers.

The image conditioning surfaces coated with the present coating can be used with any suitable ink. In a specific embodiment, the ink comprises a UV gel ink. In embodiments, the ink can be a UV curable gel ink composition comprising an optional colorant and a phase change ink vehicle comprising a radiation curable monomer or prepolymer; a photoinitiator; a reactive wax; and a gellant. For example, suitable inks for use herein are described in U.S. patent application Ser. No. 11/290,202, filed Nov. 30, 2005, entitled "Phase Change Inks Containing Photoinitiator With Phase Change Properties and Gellant Affinity," with the named inventors Peter G. Odell, Eniko Toma, and Jennifer L. Belelie, the disclosure of which is totally incorporated herein by reference, can be used, wherein the gellant is a compound of the formula

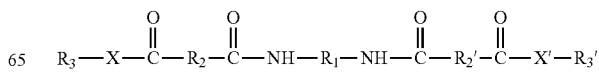

wherein $R_1$ is (i) an alkylene group, (ii) an arylene group, (iii) an arylalkylene group, (iv) an alkylarylene group; $R_2$ and $R_2'$ each, independently of the other, are (i) alkylene groups, (ii) arylene groups, (iii) arylalkylene groups, (iv) alkylarylene groups; $R_3$ and $R_3'$ each, independently of the other, are either (a) photoinitiating groups, or (b) a group which is (i) an alkyl group, (ii) an aryl group, (iii) an arylalkyl group, (iv) an alkylaryl group, provided that at least one of $R_3$ and $R_3'$ is a photoinitiating group; and X and X' each, independently of the other, is an oxygen atom or a group of the formula —$NR_4$—, wherein $R_4$ is (i) a hydrogen atom, (ii) an alkyl group, (iii) an aryl group, (iv) an arylalkyl group, (v) an alkylaryl group. The ultra-violet curable gellant ink suitable for use with the present front face coating can further be selected from U.S. Patent Publication 20070123606, published May 31, 2007, entitled "Phase Change Inks Containing Curable Amide Gellant Compounds," with the named inventors Eniko Toma, Jennifer L. Belelie, and Peter G. Odell, the disclosure of which is totally incorporated herein by reference. The ultra-violet curable gellant ink can also be selected from the inks described in U.S. Pat. No. 7,279,587 of Peter G. Odell, Eniko Toma, and Jennifer L. Belelie, entitled "Photoinitiator with Phase Change Properties and Gellant Affinity," the disclosure of which is totally incorporated herein by reference, and U.S. Pat. No. 7,276,614 of Eniko Toma, Peter G. Odell, Adela Goredema, and Jennifer L. Belelie, entitled "Curable Amide Gellant Compounds," issued Oct. 2, 2007, the disclosure of which is hereby incorporated by reference herein in its entirety. The ultra-violet curable gel inks can be prepared by any desired or suitable method, such as the methods described in U.S. Pat. No. 7,259,275, U.S. Pat. No. 7,279,587, U.S. Pat. No. 7,271,284, the disclosures of each of which are hereby incorporated by reference herein in their entireties.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Tables 1-3 set forth Control Example 1, Examples 2-7, and Comparative Example 8. Coating Examples 1-7 were prepared by mixing 19.6 grams of hydroxyl-terminated polyacrylate, Desmophen® A870 BA from Bayer Material Science, and 10.3 grams of hexamethylene diisocyanate, Desmodur® N-3300A from Bayer Material Science, in 7 grams of n-butyl acetate, 7 grams of methyl n-amyl ketone, and 7 grams of methyl isobutyl ketone. The polysiloxane additive, Silclean® 3700, a hydroxyl functional silicone modified polyacrylate from BYK, was added in varying amounts, typically 0 to 10% by weight relative to the total solid polymer weight of the formulation (does not include weight of solvent). All the components and solvent were stirred in a beaker and the resulting coating formulation was cast onto a Mylar® sheet using a drawbar coater. The coating was cured and dried at 135° C. for about 30 to about 60 minutes, yielding the low-adhesion coating disclosed herein. Optionally, a fluoro cross-linking material, such as materials known as Fluorolink®, particularly Fluorolink-D®, Fluorolink-D10H®, and Fluorolink-E10H®, available from Solvay Solexis, can be added to the coating solution in any suitable amount, such as from about 0.01 to about 5% by weight based upon the total weigh of the coating solution to increase the contact angle and the oleophobicity of the final coating.

For Examples 1-7, a 3 by 1 inch piece of each coating on Mylar sheet was fixed onto glass slide, and contact angle and sliding angle towards water, hexadecane and ultra-violet curable phase change ink were recorded as given in Tables 1-3. Contact angle and sliding angle measurements were conducted on an OCA20 goniometer from Dataphysics, which consists of a computer-controlled automatic liquid deposition system, computer controlled tilting stage and a computer-based image processing system. In a typical static contact angle measurement, ~5 µL of the test liquid droplets (water, hexadecane or UV ink) were gently deposited on the testing surface using a microsyringe and the static angle was determined by the computer software (SCA20) and each reported data is an average of >5 independent measurements. Sliding angle measurement was done by tilting the base unit at a rate of 1°/sec with a ~10 µL droplet using tilting base unit TBU90E (Dataphysics Instruments GmbH). The sliding angle is defined as the angle where the test liquid droplet starts to slide (or move). For Example 8, a 3 by 1 inch piece of Teflon® sheet was cut and placed on the goniometer, and contact angle and sliding angles were recorded as described above.

TABLE 1

| | Coating composition | | | | Water | |
|---|---|---|---|---|---|---|
| Example | Desmophen ® A 870 BA | Desmodure ® N 3300 A | % Silclean ® | Fluorolink-D ® | Contact angle | Sliding angle |
| 1 (control) | 65.6% | 34.4% | 0% | 0% | ~70° | ~51° |
| 2 | 64.3% | 33.8% | 2% | 0% | ~93° | ~30° |
| 3 | 60.7% | 31.9% | 7.5% | 0% | ~100° | ~23° |
| 4 | 64.0% | 33.6% | 2% | 0.5% | Not measured | Not measured |
| 5 | 63.0% | 33.0% | 2% | 2% | Not measured | Not measured |
| 6 | 60.3% | 31.2% | 7.5% | 0.5% | Not measured | Not measured |
| 7 | 59.1% | 31.0% | 7.5% | 2% | Not measured | Not measured |
| 8 | 0% | 0% | PTFE film | | ~118° | ~64° |

TABLE 2

| | Coating composition | | | | Hexadecane | |
|---|---|---|---|---|---|---|
| Example | Desmophen ® A 870 BA | Desmodur ® N 3300 A | % Silclean ® | Fluorolink- D ® | Contact angle | Sliding angle |
| 1 (control) | 65.6% | 34.4% | 0% | 0% | ~22° | flows |
| 2 | 64.3% | 33.8% | 2% | 0% | ~31° | ~5° |
| 3 | 60.7% | 31.9% | 7.5% | 0% | ~34° | ~2° |
| 4 | 64.0% | 33.6% | 2% | 0.5% | ~59° | ~21° |
| 5 | 63.0% | 33.0% | 2% | 2% | ~62° | ~22° |
| 6 | 60.3% | 31.2% | 7.5% | 0.5% | ~55° | ~16° |
| 7 | 59.1% | 31.0% | 7.5% | 2% | ~62° | ~21° |
| 8 | 0% | 0% | PTFE film | | ~48° | ~31° |

TABLE 3

| | Coating composition | | | | UV Ink | |
|---|---|---|---|---|---|---|
| Example | Desmophen ® A 870 BA | Desmodur ® N 3300 A | % Silclean ® | Fluorolink- D ® | Contact angle | Sliding angle |
| 1 (control) | 65.6% | 34.4% | 0% | 0% | 17° | flows |
| 2 | 64.3% | 33.8% | 2% | 0% | 36° | 16° |
| 3 | 60.7% | 31.9% | 7.5% | 0% | 41° | 11° |
| 4 | 64.0% | 33.6% | 2% | 0.5% | 59° | 19° |
| 5 | 63.0% | 33.0% | 2% | 2% | Not measured | Not measured |
| 6 | 60.3% | 31.2% | 7.5% | 0.5% | Not measured | Not measured |
| 7 | 59.1% | 31.0% | 7.5% | 2% | Not measured | Not measured |
| 8 | 0% | 0% | PTFE film | | 58° | >90° |

Tables 1-3 summarize contact angle and sliding angle measurement data for control Example 1, Examples 2-7 comprising low adhesion contact leveling coatings in accordance with the present disclosure, and Example 8 comprising a comparative PTFE film. As can be seen in Table 2 and 3, the Examples 2-7 had low sliding angles for hexadecane and for UV gel ink at 75° C. In addition, both hexadecane and UV gel ink drops rolled off these surfaces cleanly without leaving any visible residue, indicating low adhesion between the coating and the test liquid droplet. While not wishing to be bound by theory, the present inventors believe that low sliding angle along with clean roll-off is a key indicator for low adhesion towards ink and low ink off-set surfaces. Low ink sliding angles (low ink adhesion) therefore can be an important indicator of anti-offset coatings.

While the present coatings exhibit advantageous low adhesion properties for improving ink offset problem at time zero, these coatings must maintain these properties through the many leveling cycles over the contact levelers lifetime. To test the robustness of these coatings, the Crock (cloth) test with the Taber® Linear Abraser Model 5700 was performed on these coatings for up to >200 cycles. Results showed that the sliding angle of the present coatings remain unchanged against hexadecane and UV ink after >200 wipes. In embodiments, the coating surface maintains a low sliding angle even after 200 cleaning cycles with a Crock cloth, wherein the low sliding angle is from about 1° to less than about 30°, from about 1° to less than about 25°, from about 1° to less than about 20°, or from less than about 1° to less than about 15°.

Figure 5A:
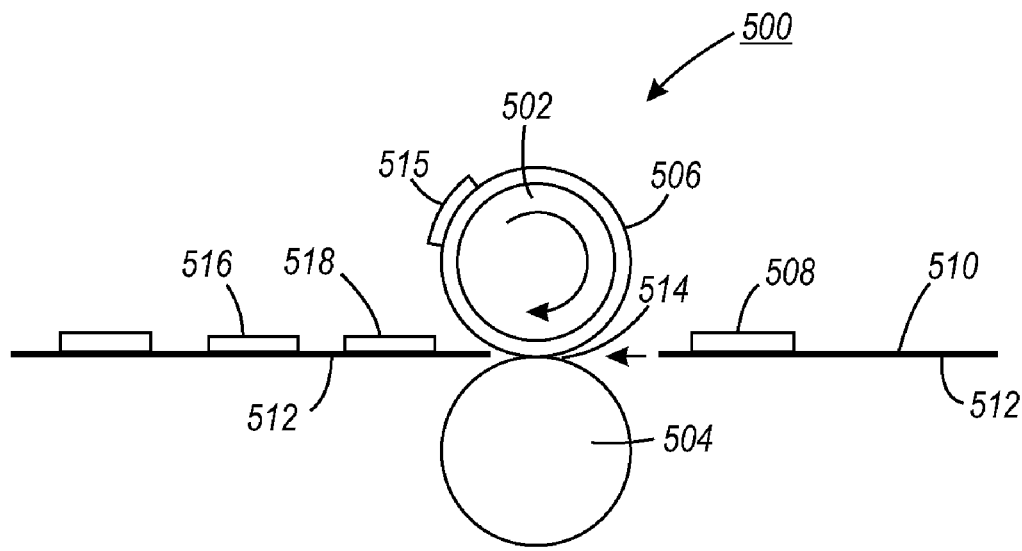
FIGS. 5A and 5B illustrate an offline fixture used to evaluate contact leveling by surfaces described in examples 1-8.
Figure 5B:
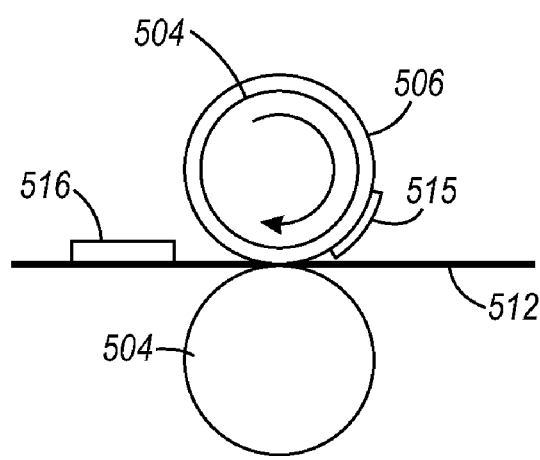

A testing fixture 500 as shown in FIG. 5 was prepared to evaluate UV gel ink offset to the image conditioning surface. The tool (testing fixture) 500 consisted of two motor driven, fixed distance soft silicone rollers 502, 504. Motor not shown. The roll speed can be controlled to a speed of between 10 to 100 inches/sec. Test leveling surfaces 506 comprising the coatings of Comparative Example 1, Examples 2-7, and Comparative Example 8 were fixed on the top roller 502 to simulate a leveling surface. An approximately 12 micron thick cyan colored UV gel ink patch 508 was printed on an inkjet transparency 510, and a piece of transparency having the ink patch was then attached to an A3 size paper sheet 512. This sheet 512 was fed into the rollers 502, 504 such that the uncured UV gel ink patch 508 passed through the roller nip 514 and contacted the test leveling surface 506. The speed of the rollers 502, 504 was 100 inches/second. Any UV ink offset 515 to the leveling surface 506 is re-transferred back to the paper 512 in the next revolution as the roller is continuously rotating, and the offset ink material 515 shows up as 1st and 2nd offset patch 516, 518 on paper 512. Ink offset for various coupons was then evaluated and graded visually.

Figures 6A, 6B:
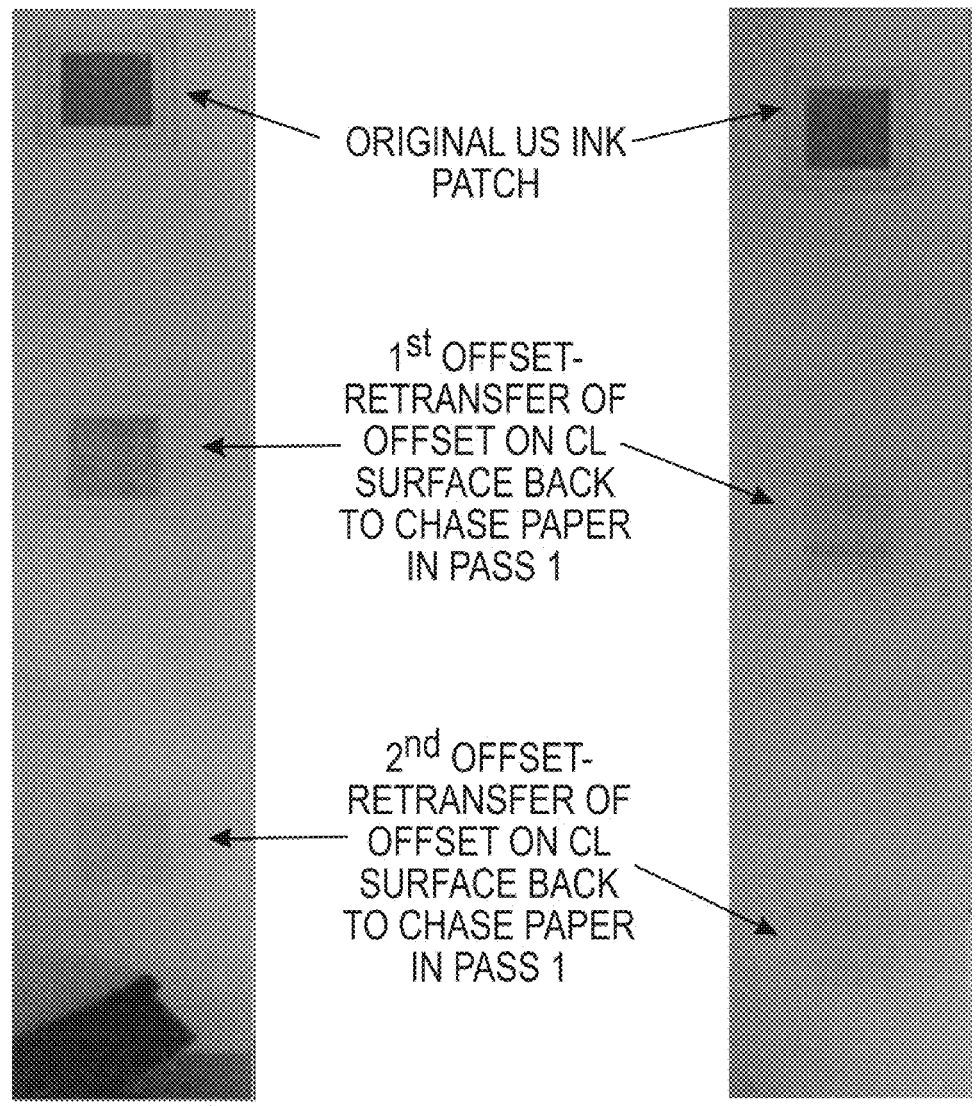
FIGS. 6A and 6B illustrate a comparison of UV gel ink leveling by examples 3 and 8.

FIGS. 6A and 6B illustrate comparison of UV gel ink leveling of Examples 3 and Comparative Example 8. FIG. 6B displays pictures of UV ink patch leveled in the offline testing fixture using the low adhesion coating of example 3. FIG. 6A displays pictures of a UV ink patch leveled in the offline testing fixture using the comparative PTFE coating of Example 8. The leveling surface composed of Example 3 has a lower adhesion towards UV gel ink than Comparative Example 8. This is indicated by lower sliding angles of Example 3 towards hexadecane and UV gel ink over Comparative Example 8, as shown in Tables 2 and 3. As can be seen clearly, the Comparative Example 8 PTFE leveling surface resulted in more offset than Example 3.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A contact leveling surface for an ink jet imaging member comprising:
   a low adhesion coating, wherein when the low adhesion coating is disposed on a contact leveling surface, jetted drops of ultra-violet gel ink exhibit a low sliding angle with the contact leveling surface, wherein the low sliding angle is less than 1° to less than 30°.

2. The coating of claim 1, wherein the low sliding angle is from 1° to less than 15°.

3. The coating of claim 1, wherein the low sliding angle is from less than 20° to less than 30°.

4. The coating of claim 1, wherein the low adhesion coating comprises:
   a suitable polymer or oligomer containing an isocyanate functional group;
   a suitable polymer or oligomer containing a hydroxyl functional group;
   a suitable hydroxyl functionalized polymer or oligomer containing at least one polysiloxane unit; and
   optionally, a hydroxyl functionalized fluoro-crosslinking material.

5. The coating of claim 4, wherein the suitable polymer or oligomer containing an isocyanate functional group is selected from the group consisting of diphenylmethane diisocyanate, toluene diisocyanate, hexamethylene diisocyanate, isophorone diisocyanate, or suitable polymer or oligomer containing isocyanate (—NCO) functional groups, and mixtures thereof.

6. The coating of claim 1, wherein the low adhesion coating comprises:
   an isocyanate;
   a polylol;
   a hydroxyl functionalized polysiloxane; and
   optionally, a hydroxyl functionalized fluoro-crosslinking material.

7. The coating of claim 1, wherein the coating surface maintains a low sliding angle even after 200 cleaning cycles with a Crock cloth, wherein the low sliding angle is from 1° to less than 30°.

8. A printing apparatus comprising:
   a printing station including at least one printhead for applying ink to an image receiving substrate to create an ink image, wherein the ink comprises an ultra-violet curable gel ink;
   a contact leveling member for conditioning the ink image by disposing the contact leveling member in pressure contact with the ink image;
   wherein the contact leveling member comprises a substrate and a low adhesion contact leveling coating disposed over the substrate; and
   wherein the low adhesion contact leveling coating comprises a coating on which jetted drops of ultra-violet gel ink exhibit a low sliding angle on the leveling surface having the coating, wherein the low sliding angle is less than from 1° to less than 30°.

9. The printing apparatus of claim 8, wherein the image receiving substrate is paper.

10. The printing apparatus of claim 8, wherein the contact leveling member is a contact leveling roller.

11. The printing apparatus of claim 8, wherein the low sliding angle is from 1° to less than 20°.

12. The printing apparatus of claim 8, wherein the low sliding angle is from 1° to less than 15°.

13. The printing apparatus of claim 8, wherein the low adhesion coating comprises:
    a suitable polymer or oligomer containing an isocyanate functional group;
    a suitable polymer or oligomer containing a hydroxyl functional group;
    a suitable hydroxyl functionalized polymer or oligomer containing at least one polysiloxane unit; and
    optionally, a hydroxyl functionalized fluoro-crosslinking material.

14. The image conditioning method of claim 13, wherein the low adhesion coating comprises:
    a suitable polymer or oligomer containing an isocyanate functional group;
    a suitable polymer or oligomer containing a hydroxyl functional group;
    a suitable hydroxyl functionalized polymer or oligomer containing at least one polysiloxane unit; and
    optionally, a hydroxyl functionalized fluoro-crosslinking material.

15. An image conditioning method comprising:
    forming an image on an image receiving substrate with an ultra-violet curable gel ink;
    conditioning the image by disposing a contact leveling member in pressure contact with the ink image;
    wherein the contact leveling member comprises a substrate and a contact leveling coating disposed over the substrate;
    wherein the low adhesion contact leveling coating comprises a coating on which jetted drops of ultra-violet gel ink exhibits a low sliding angle on the leveling surface having the coating, wherein the low sliding angle is less than from 1° to less than 30°.

16. The image conditioning method of claim 15, wherein the low sliding angle is from 1° to less than 20°.

17. The image conditioning method of claim 16, wherein the low sliding angle is from 1° to less than 15°.

18. The image conditioning method of claim 15, wherein the image receiving substrate passes through a contact leveling nip at a transit speed of from 1 to 100 inches per second.

19. The image conditioning method of claim 15, wherein the contact leveling surface maintains a low sliding angle of from 1° to less than 30°, even after 200 cleaning cycles with a Crock cloth.

20. The image conditioning method of claim 15, wherein the contact leveling surface maintains a low sliding angle of from 1° to less than 20°, even after 200 cleaning cycles with a Crock cloth.

* * * * *